United States Patent
Ngan et al.

(10) Patent No.: US 7,197,288 B1
(45) Date of Patent: Mar. 27, 2007

(54) METHOD AND SYSTEM OF SPREAD SPECTRUM MODULATION

(75) Inventors: John Cheong-Wai Ngan, Shawnee, KS (US); Dae-Sik Oh, Overland Park, KS (US); Frederick Fortuna, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 842 days.

(21) Appl. No.: 10/178,426

(22) Filed: Jun. 24, 2002

(51) Int. Cl.
*H04B 1/18* (2006.01)

(52) U.S. Cl. .................. 455/186.1; 455/436; 370/342; 370/341; 370/331; 370/335

(58) Field of Classification Search ........... 455/522, 455/69, 456.1, 447, 515, 562, 561, 186.1, 455/42; 370/335, 342, 341, 334, 243, 345
See application file for complete search history.

(56) References Cited

U.S. PATENT DOCUMENTS

| | | | |
|---|---|---|---|
| 6,272,122 B1 * | 8/2001 | Wee | 370/342 |
| 6,449,290 B1 * | 9/2002 | Willars et al. | 370/507 |
| 6,456,652 B1 * | 9/2002 | Kim et al. | 375/224 |
| 6,744,747 B2 * | 6/2004 | Shiu et al. | 370/331 |
| 6,748,213 B1 * | 6/2004 | Kim | 455/433 |

OTHER PUBLICATIONS

Joseph C. Liberti & Theodore Rappaport, Smart Antennas for Wireless Communications—IS-95 and Third Generation CDMA Applications, Prentice Hall 1999, p. 42-47.
Scott Baxter, Course RF, Chapter 7: "Technical Introduction to CDMA," Jan. 2000, p. 1-150.

* cited by examiner

*Primary Examiner*—Temica Beamer
*Assistant Examiner*—Joy K. Contee (57) ABSTRACT

A method and system of communicating between a base station and a mobile station is disclosed. The base station may be the core of a cell site, which is defined by radio frequency radiation patterns. The cell site may be divided into a number of sectors, each defined respectively by radiation patterns. The mobile station, while within any of the sectors of the cell site, may communicate with the base station on a reverse link by encoding signals using a spreading sequence offset by a common time delay. On the forward link, each sector is assigned a respective time delay that is within the common time delay. While within a respective sector of the cell site, the mobile station may receive signals from the base station on the forward link that have been encoded with the spreading sequence offset by the sector's respective time delay.

20 Claims, 6 Drawing Sheets

METHOD AND SYSTEM OF SPREAD SPECTRUM MODULATION

BACKGROUND

A. Field of Invention

The present invention is related to wireless communication system configuration, and more particularly, to a method and system of spread spectrum modulation.

B. Description of Related Art

In a typical wireless communication system, an area is divided geographically into a number of cell sites, each defined by one or more radio frequency (RF) radiation patterns from a respective base transceiver station (BTS) antenna. Most cell sites are usually further divided geographically into a number of sectors, each defined respectively by radiation patterns from directional antenna components of the respective BTS. The radiation pattern of each sector in a cell site produces an air interface that defines a respective coverage area.

Cell sites of the typical wireless communication system are operated by one or more wireless service providers (WSP). A WSP is a company that provides telecommunications through RF signals rather than (or in addition to) through end-to-end wire communication. A WSP may transmit signals using one or more carrier frequencies. A carrier frequency (or simply carrier) is a transmitted electromagnetic pulse or wave at a steady frequency of alternation on which information can be imposed by increasing signal strength, varying the frequency, varying the wave phase, or other means. When a cell site is operated by WSPs with multiple carrier frequencies, the cell site may be considered to have a multiple of its number of sectors. For instance, if a cell site is divided into three sectors by directional antenna elements, and the cell site is operated by a WSP that transmits signals over four carrier frequencies, then the cell site may effectively have twelve sectors, three operating at each of the four carrier frequencies.

A code division multiple access (CDMA) wireless communication system may have cell sites operated with multiple carrier frequencies. On a given frequency in a CDMA system, multiple communication channels exist, each distinguished by a "Walsh code." Walsh code is a term used for a digital modulation code that distinguishes individual signals on the RF carrier frequency being transmitted. There are 64 possible Walsh codes and each code is 64 bits long.

The communication channels of the CDMA system that the Walsh code identifies include a pilot channel (Walsh code 0), a sync channel (Walsh code 32), a number of paging channels (Walsh codes 1 possibly through 7), and a number of traffic channels (any remaining Walsh codes). Pilot, sync, and paging channels are "overhead," or system channels that are used to establish system timing and BTS identity with an MS and to manage the signal transmissions between an MS and a BTS. Traffic channels carry individual user conversations or data.

The pilot signal continuously repeats a simple signal at high power levels so that MSs can easily locate the BTS. The pilot signal is usually the strongest of the 64 Walsh channels, and is on Walsh code 0. Paging channels can be found on one or more of Walsh codes 1 to 7. These channels are used to notify MSs of incoming calls from the system and to handle the MSs' responses in order to assign the incoming calls to traffic channels. The synchronization, or sync channel is found on Walsh code 32. This channel carries a single repeating message with timing and system configuration information from the wireless communication system.

In active communication, a Walsh codes are used to distinguish BTSs from one another. When an MS detects suitable signal strength of a Walsh code (from the pilot channel) of a BTS, the MS may begin communication with the BTS that has that Walsh code. The BTS may also determine which MS to communicate with by monitoring pilot signals of MSs in the wireless system. The BTS may send signals to the MS on a forward communication link (BTS-MS communication) and the MS may send signals to the BTS on a reverse communication link (MS-BTS communication).

In the CDMA system, when an MS is present in a given sector of a cell site, communications between the MS and the BTS of the cell site may be encoded by an encoding scheme of the sector, regardless of the carrier frequency being used. An encoding scheme may be a signaling protocol used to distinguish communications between MSs and BTSs. Each sector of a cell site (e.g., sectors A, B, C) may use a different encoding scheme in order to distinguish between the other sectors of the cell site (i.e., sector A may distinguish from sectors B and C, etc.).

In normal operation of the typical wireless communication system, when an MS is within a sector of a cell site defined by a BTS, the MS may communicate with the BTS through the air interface produced by the sector. If the MS moves into a new sector of a new BTS, through communication with a base station controller (BSC), the MS may simply communicate with the new BTS through the new sector in order to complete a handoff from one BTS to the next. Therefore, when the MS moves from a coverage area of one BTS to another, a "soft handoff" may occur because the MS transitions from an initial sector of a cell site to a different sector of a different cell site.

Similarly, when an MS is within an initial sector of a BTS and the MS moves from the initial sector of the BTS into a new sector of the same BTS, the MS may then communicate with the BTS through the new sector. Through communication with the BTS, the MS may simply switch to use the new sector in order to complete the handoff from the initial sector to the next. Therefore, when the MS moves from one sector to another within the same cell site, a "softer handoff" occurs.

Soft handoff and softer handoff between an MS and a BTS may interrupt signal transmission and reception between the MS and the BTS. In addition, the MS may be required to constantly monitor pilot signals from the BTS that the MS is in communication with as well as pilot signals from other nearby BTSs in order to determine if a soft handoff or a softer handoff is necessary. This can become inefficient and consume a large amount of power within the MS. Consequently, it is desirable to reduce handoff between an MS and a BTS.

SUMMARY

In an exemplary embodiment, a method of spread spectrum modulation is provided. The method may be carried out using a BTS that radiates in a number of directions to provide a number of sectors. Each sector has a respective air interface in which an MS in the sector communicates with the BTS. The BTS may receive signals transmitted from an MS, while the MS is within any of the number of sectors. The signals may be encoded with a common spreading sequence. Each sector of the number of sectors is assigned a respective time delay, such that any adjacent sectors of the number of sectors have different respective time delays than each other. The BTS may encode signals to be sent to an MS through a respective sector of the BTS with the common spreading sequence offset by the respective sector's time delay to provide an encoded signal for the sector. The BTS may then send the encoded signal into the sector's respective air interface for receipt by an MS operating in the sector.

In another embodiment, a cellular BTS is provided. The cellular BTS may communicate with an MS that is in a given sector of the BTS. The BTS and the MS may communicate via wireless signals that are encoded with a pseudo-noise (PN) sequence. Reverse link communications between the MS and the cellular BTS, while the MS is in any of the number of sectors, are encoded with the PN sequence offset by a common time delay. Forward link communications between the MS and the cellular BTS, while the MS is in a respective sector of the number of sectors, are encoded with the PN sequence offset by a respective time delay that is within the common time delay. In addition, forward link communications within any adjacent sectors of the number of sectors are encoded with the PN sequence offset by a different time delay than each other.

In still another embodiment, a system is provided. The system includes a means for providing radiation patterns that may each define a number of sectors of a cellular BTS. Each sector of the BTS may have a respective air interface. The system also includes a means for differentiating signals transmitted from an MS to the cellular BTS through any of the respective air interfaces by encoding the signals with a common spreading sequence. The system further includes a means for differentiating signals transmitted from the cellular BTS to the MS through any of the respective air interfaces by encoding the signals with a respective portion of the common spreading sequence. Each respective air interface may be assigned a different respective portion of the common spreading sequence.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

Figure 1:
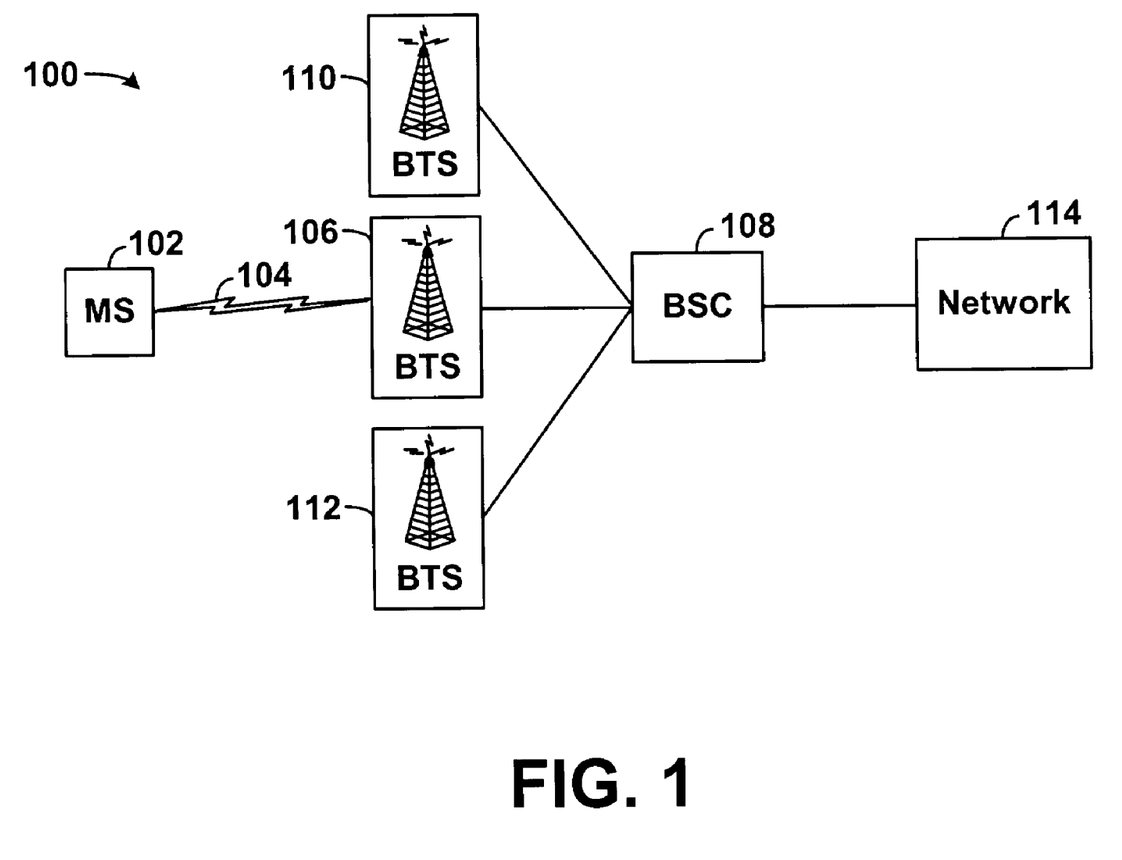
FIG. 1 is a block diagram illustrating one embodiment of a wireless communication system.

In accordance with an exemplary embodiment, a method and system to communicate between a BTS and an MS within a wireless communication system, such as a cellular communication network for instance, is provided. Referring now to the figures, FIG. 1 is a block diagram illustrating one embodiment of a wireless communication system 100. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include an MS 102 in communication via an air interface 104 with a BTS 106, which is coupled to a BSC 108. The BSC 108 is also coupled to a network 114. MSs such as cellular telephones, personal digital assistants (PDA), wireless modems, or other mobile nodes may be used in the wireless communication system 100.

BTS 106 may include one or more antennas arranged to produce radiation patterns defining one or more sectors. Additional BTSs 110 and 112 coupled to BSC 108 are also illustrated. Although three BTSs are illustrated within FIG. 1, it will be understood that more or fewer BTSs may be present within the wireless communication system 100.

BSC 108 is an interface between BTSs 106, 110, and 112 and the network 114. BSC 108 also may handle radio resource management and radio network management functions for BTSs 106, 110, and 112.

The network 114 may be any transport network and/or entity used to route signals to and from the MS 102. For example, network 114 may include connections to a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and an uplink server, for example.

Each of the couplings of the wireless communication system 100, excluding the air interface 104, may be interfaces such as a trunk level 1 (T1) line, an Ethernet line, a signaling link, or other connections (whether wired or wireless).

The wireless communication system 100 may be divided geographically into a number of cell sites. At the core of each cell site may be a BTS, such as BTSs 106, 110, and 112, whose antennas define an RF radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface, such as air interface 104, that defines a respective coverage area. When an MS is positioned within such a coverage area of a sector in a cell site, the air interface provides a communication path between the MS and the BTS. And the MS can then communicate through this path with entities on the network 114.

Each BTS 106, 110, and 112 of the wireless communication system 100 may transmit signals using the same frequencies and using the same group of 64 Walsh codes for pilot, paging, sync, and traffic channels. Therefore, another layer of signal encoding may be required so that an MS can differentiate forward and reverse link signaling from BTSs and also through individual sectors of the BTSs.

Spread spectrum signal encoding may be used to distinguish forward and reverse link signaling. Spread spectrum is a type of modulation that spreads data transmission across the available frequency band, in excess of the minimum bandwidth required to transmit the data. A signal may be "spread" by distributing the power of the signal over a bandwidth, which is greater than the bandwidth of the signal itself. Spreading the signal across the frequency spectrum may cause the signal to be resistant to noise, interference, and eavesdropping, for example.

Since multiple MSs may simultaneously transmit signals using a given carrier frequency of the wireless communication system 100, wireless signals transmitted in the system 100 may be distinguished by spreading the signals over the wide bandwidth available using the spread spectrum modulation. Any frequency band or allocated portion of the frequency spectrum (i.e., bandwidth) may be used.

Spread spectrum modulation involves modulating or spreading signals with spreading codes. Several possible spreading sequences exist and also several possible spreading modulation techniques exist. However, other types of modulation and/or encoding schemes may be used to distinguish wireless signaling within the wireless communication system 100.

A pseudo-noise (PN) signal or PN sequence may be one of the spreading codes used to encode BTS-MS and MS-BTS communications in the wireless communication system 100. Two spreading sequences, referred to as "short" and "long" PN sequences, may be used to encode signals. The long PN-sequence may be used to encode reverse link communications and the short PN-sequence may be used to encode forward link communications. Alternatively, only one spreading sequence may be used to encode signals on both the forward and reverse link.

The PN sequence may be a pseudo-random sequence of binary pulses, referred to as chips, whose values are "+1" or "−1" and whose duration equals a time $T_c$, which is referred to as chip-time or chip-period. The time of transmission of a single information bit (i.e., $T_b$) is defined as the number of chips (i.e., N) per transmitted bit and is calculated by $T_b=NT_c$. The term "chip" is used to avoid confusion with the term "bit." A bit describes a single digital element of a digitized MS conversation or data transmission. Since data is spread before being transmitted via RF, the term "chip" represents the smallest digital element after spreading. For example, one version of CDMA equates 128 chips to one bit; therefore a chip is a division of a bit (i.e., units of a bit).

A spreading sequence may be generated using a tapped shift register, for example. A shift register is a logical device that holds a number of bits (i.e., electrical impulses translated into "1's" and "0's") equal to the number of cells in the register. When a clock pulses, each bit moves one cell down the register and the last bit wraps back to the first cell. No matter the combination of 1's and 0's, the same sequence, equal to the number of cells in the register, will pass by again and again.

If the register is cross-connected at several points so that the value of the last cell influences values of several other cells in the shift register, the outputs change randomly. This "tapped shift register" generates a self-mutating pattern that keeps changing, with a total possibility of $2^M$ different patterns (where M is the number of cells in the register). Each pattern is M bits long.

A 15-bit tapped shift register may be used to produce the short PN-sequence resulting in approximately 32,768 ($2^{15}$) different PN sequences, each 15 bits long. The short PN-sequence (and other PN-sequences) may transmit at a chip rate of about 1.2288 Mchips/sec (mega-chips per second), so that the short PN-sequence repeats about every 26.67 ms (milli-seconds). A 42-bit tapped shift register may be used to produce the long PN-sequence. The long PN-sequence may have $2^{42}-1$ different patterns (i.e., 4,398,046,511,103 patterns), each 42 bits long. However, a register that has any number of bits may be used to generate a spreading sequence to encode signals within the wireless communication system 100.

A useful property of the short and long PN-sequences, and possibly other spreading sequences, is that sections within them, offset from one another, appear to be orthogonal. For example, a 64-bit piece taken from one point in the short PN-sequence appears essentially uncorrelated (i.e., orthogonal) when compared with a 64-bit or longer piece taken from a different point in the short PN-sequence. This property allows for the use of a single generated spreading sequence with a known time delay or offset to distinguish different MS signals. Individual BTSs can utilize the same spreading sequence with a different "starting point" or time delay to encode forward link signals for each respective sector of a cell site in the wireless communication system 100.

Signals may be encoded with spreading sequences using several possible modulation or encoding techniques. For example, a signal may be encoded with a spreading sequence by using logical operations, such as an "exclusive or" of the signal with the spreading sequence in order to spread the signal into the available frequency band.

Also, a direct sequence spreading technique or a frequency hopping spreading technique may be used. The direct sequence spreading technique directly multiplies a signal by a wide bandwidth spreading sequence, such as a PN sequence. The signal's power is spread over the wide bandwidth by multiplying the signal by the wide bandwidth spreading sequence. The resulting product is a signal that has a bandwidth about equal to the bandwidth of the wide bandwidth spreading sequence. For example, assume a signal s(t) has a data rate of 19,200 bits/second. Then each bit has a duration of $\frac{1}{19,200}$ or about 52.0833 μsec. If s(t) is multiplied by a spreading sequence PN(t) that has a chip rate of 1.2288 Mchips/sec, each bit will contain 1.2288 Mchips/sec×52.0833 μsec or 64 chips. The bandwidth of the signal s(t) is increased (i.e., spread) by a factor of 64, from 0.0192 MHz to 64×0.0192 or 1.2288 MHz.

A frequency hopping spreading technique may be performed by modulating the signal to "hop" in a fixed range of values established by a spreading sequence (i.e., modulating with a center frequency that shifts according to the spreading sequence). For instance, if a signal has a 100 Khz bandwidth, and the available spread spectrum bandwidth is 100 Mhz, the carrier frequency can hop in a range of 1000 possible values.

In an exemplary embodiment, reverse link communications (i.e., wireless signals sent from the MS 102 to a BTS) through all sectors of a given cell site in the wireless communication system 100 may be encoded with a common signal-encoding scheme. The common signal-encoding scheme refers to the same signal-encoding scheme for reverse link communications through all sectors of the cell site. The signal-encoding scheme may be a spreading sequence such as a pseudo-random generated sequence. However, any spreading sequence, whether real and/or complex, may be used that scrambles data within the wireless signals to insure that the wireless signals appear random to provide a measure of privacy and distinction between other signals. Spreading sequences that have various desired statistical properties may also be used.

In addition, in the exemplary embodiment, each sector of a cell site in the wireless communication system 100 may be assigned a respective time delay or time offset of the signal-encoding scheme or spreading sequence, and forward link communications between an MS while within a respective sector of the cell site and the BTS are encoded with the spreading sequence offset by the sector's respective time delay. Each sector of the cell sites in the wireless communication system 100 may distinguish forward link communications from adjacent sectors, (whether an adjacent sector of the same cell site or an adjacent sector of another cell site) by encoding signals with the common spreading sequence offset by the sector's assigned time delay. The same spreading sequence may be used by multiple sectors of a BTS by using different timing offsets in the spreading sequence for forward link signaling.

As an example, a spreading sequence such as "1abc2abc3abc4abc5abc6abc7abc8," may be used to encode signals between an MS and a BTS of a three-sector (sectors A, B, and C) cell site. The example spreading code includes a sequence that has units of "12345678" and each unit of the sequence is separated by three sub-units, namely "abc." On the reverse link, signals between the MS and the BTS while the MS is in any of sectors A, B, and/or C may be encoded with a common spreading code of "12345," using a direct sequence spreading technique for example. However, on the forward link, signals may be encoded according to an assigned sector time offset of the spreading code. For example, sector A may be assigned a one sub-unit time delay and the BTS may encode forward link signals through sector A using subsequence "a2345." Sector B may be assigned a two sub-unit time delay and the BTS may encode forward link signals through sector B using subsequence "b2345," and sector C may be assigned a three sub-unit time delay and the BTS may encode forward link signals through sector C using subsequence "c2345."

In this manner, the MS may recognize the cell site as an omni-sectored (i.e., one sector) cell site because each sector is assigned a spreading code that is similar to the common spreading code. The MS may recognize the spreading code of all the sectors to be equivalent to one another because the MS would distinguish signals using only the units of the spreading code. Since each sector's spreading code only differs by one sub-unit, each sector's spreading code appears equivalent to the MS.

Note that the assigned spreading codes of the sectors may differ by more than one sub-unit. The three sub-units provide a time window of which the BTS may communicate through a respective sector to the MS on the forward link.

In the exemplary embodiment, in the forward link, the sectors of a cell site are each assigned a starting point of a common spreading sequence that characterizes a time delay of communication. The starting points may be assigned arbitrarily or they may be assigned according to statistical properties of the spreading sequence. For example, using the short PN-sequence as the spreading sequence, the time delay may be an integer multiple of 64 chips of the short PN-sequence to retain orthogonality of signals, and since the short PN-sequence transmits at a chip rate of about 1.2288 Mchips/sec, the time delay is approximately a 52.08 µsec (micro-seconds) time window, from the next time delay. And since there are 32,768 chips, and time delays or "PN offsets" may be assigned to be integer multiples of 64 chips long, there may be approximately 512 different PN-offsets.

The MS and the BTS may be synchronized to a common time reference in order to communicate using the time delays of the common spreading code. For instance, MSs and BTSs may communicate using a CDMA system time, which began Jan. 6, 1980, at 00:00:00 coordinated universal time (UTC), and is substantially the same as global positioning system (GPS) time, which differs from UTC time by a matter of a few "leap seconds." The MS may receive signals sent from a BTS and de-spread the signals using the common spreading code of the BTS. The MS may generate the common spreading code offset by assigned time delays by synchronizing an internal clock to match the BTS's internal clock.

In one embodiment, the wireless communication system 100 may be a CDMA system and when an MS is present in any given sector of a cell site, reverse link communications between the MS and the BTS of the cell site are encoded with a PN-sequence offset by a common PN-offset, regardless of the position of the MS within the cell site and regardless of the carrier frequency being used. For example, sectors of different base stations may encode reverse link signals using different PN-offsets, but all sectors of a common BTS may encode reverse link signals using the same PN-sequence offset by the same PN-offset. And, for forward link communications, each respective sector of the common BTS is assigned a respective PN-offset that is within a time window (described more fully below) of the common PN-offset. Signals sent on the forward link may be encoded using the PN-sequence offset by the PN-offset of the respective sector which the MS is within.

Figure 2:
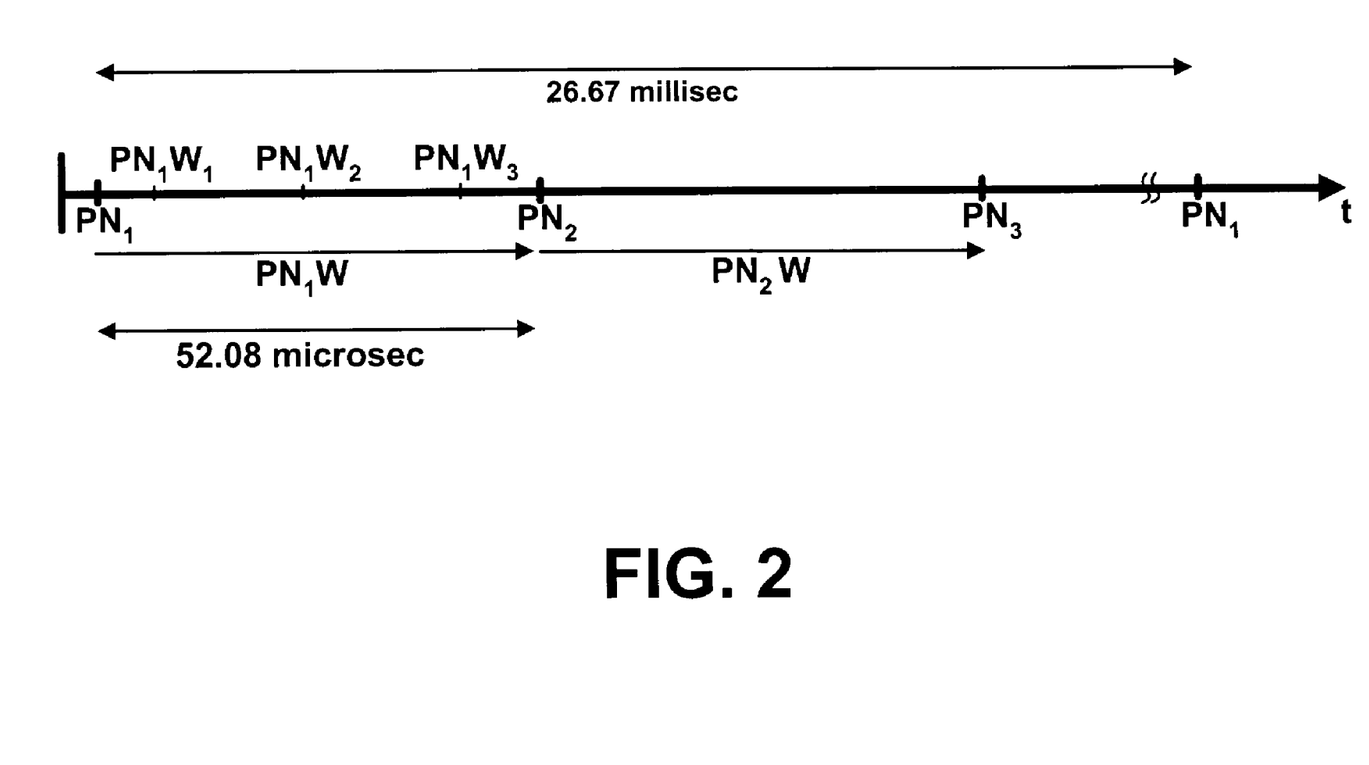
FIG. 2 is a timeline illustrating one embodiment of encoding signals.

FIG. 2 is a timeline illustrating PN-offsets of the short PN-sequence. As illustrated, the short PN-sequence repeats approximately every 26.67 milli-seconds. In existing wireless communication systems, two different sectors of the same cell site of a BTS encode forward and reverse link signals using PN-offset values of $PN_1$ and $PN_2$, i.e., two adjacent PN-offset values. $PN_1$ and $PN_2$ may be assigned to be 64 chips apart, which results in an approximate 52.08 µsec time window due to the 1.2288 Mchips/sec chip transmission rate of the short PN-sequence.

As an example, each sector within a cell site of a BTS of the wireless communication system 100 may encode signals on the reverse link using $PN_1$ and encode signals on the forward link using PN-offsets within the PN-offset time window $PN_1W$ defined by the common PN-offset $PN_1$. For example, two different sectors within the cell site may encode signals on the forward link using differently shifted PN-offset values within the time window, such as $PN_1W_1$ and $PN_1W_2$ illustrated in FIG. 2, which may be slightly shifted values of the original $PN_1$. However, it may be desired to have none of the shifted PN-offset values (i.e., $PN_1W_1$, $PN_1W_2$, etc.) exceed the 52.08 µsec window. Therefore, forward link signals may be encoded with the PN-sequence offset by any amount within the time window and still be recognized by the MS to be encoded with the same PN-offset since the MS recognizes all signals encoded by the PN-sequence offset by values within the time window as equivalently encoded signals.

Since the BTS may communicate to the MS with signals encoded by a spreading code offset by any amount within a time window, the MS may be unaware that the BTS is using different time offsets for respective sectors of the same cell site. In operation, the entire cell site may appear to the MS as a single sector cell site.

Figure 3:
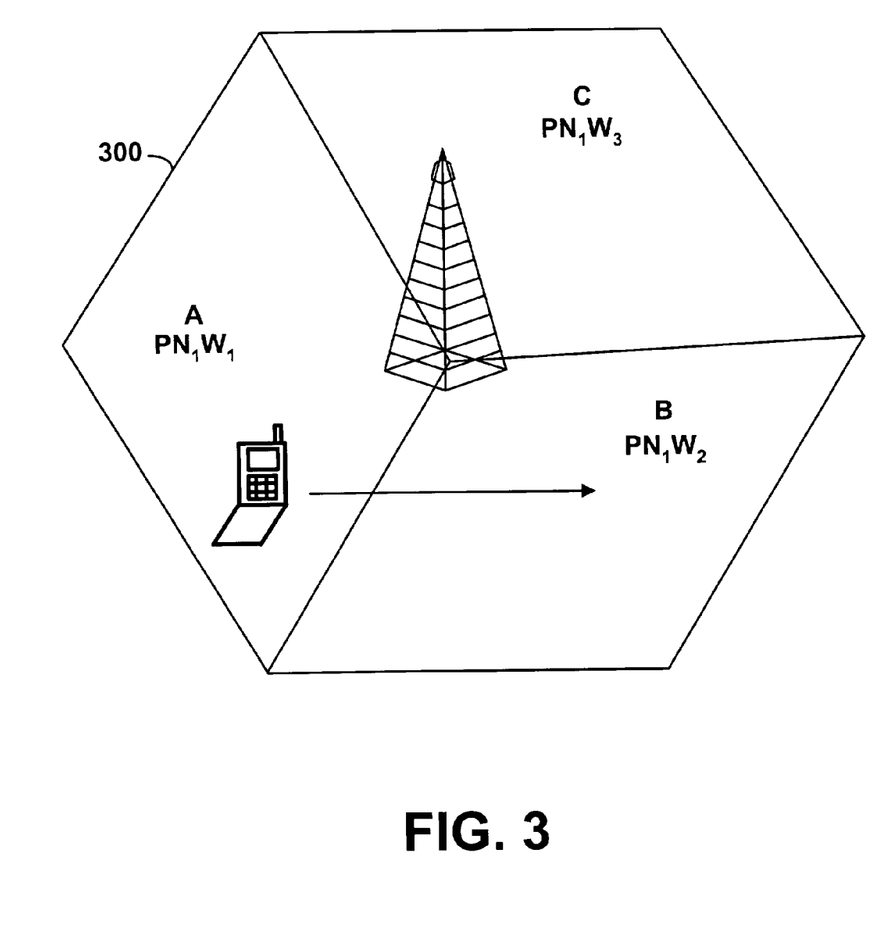
FIG. 3 is a conceptual representation of a cell site.

With the benefit of the exemplary embodiment, softer handoff in sectors of a cell site of the wireless communication system 100 may be reduced and/or eliminated because the MS may be unaware that the BTS uses different time offsets of a spreading sequence to encode signals on the forward link. As illustrated in FIG. 3, for instance, consider a cell site 300 that has a BTS that has three sectors (e.g., A, B, and C) defined by radiation patterns of antennas. An MS may be operating on a reverse communication link in sector A and may transmit signals encoded by a spreading sequence offset by an offset value of $PN_1$ as illustrated in FIG. 2. The BTS may be communicating through sector A with the MS on a forward communication link by encoding signals with the spreading sequence offset by a shifted offset value of $PN_1W_1$ as illustrated in FIG. 2. The BTS may monitor its coverage area, or possibly only each sector adjacent sector A, for a signal strength of the MS.

The MS may then travel from sector A to sector B. When the BTS recognizes and receives a predetermined signal strength of the MS through sector B, the BTS may initiate communication with the MS on the forward communication link through sector B by encoding signals with the spreading sequence offset by a differently shifted offset value of $PN_1W_2$ that is within the time window defined by $PN_1$. The MS may still communicate with the BTS on the reverse link by encoding signals with the spreading sequence offset by the original $PN_1$. Once the MS travels away from sector A such that the BTS no longer recognizes a suitable signal strength from the MS through sector A, the MS may utilize sector B for communications. This handoff of the MS from sector A to sector B may be done transparently to the MS since reverse link communications between the MS and the BTS are uninterrupted because the MS encodes all reverse link communications while within any sector of cell site 300 by using the same PN-offset (i.e., $PN_1$).

The BTS may monitor the signal strength of the MS in order to determine which sector's air interface to communicate through with the MS. For example, in a CDMA system operating according to industry standard IS-2000-2 (published in March 2000 as TIA/EIAIS-2000.2-A), the BTS and the MS may engage in a two-part power control process. In this process, the BTS may maintain a "set point" decibel measure of the MS signal energy to noise (i.e., spectral density). The set point represents how strong the MS signal may need to be for the BTS to be able to successfully receive signals transmitted by the MS.

In the wireless communication system 100 illustrated in FIG. 1, the MS 102 may monitor signal strength of two different sectors between which the MS 102 is traveling, or between the two nearest sectors of the MS 102 by using a rake receiver. The rake receiver may capture the different time arrivals of wireless signals separately by using correlation properties of the spreading sequence used to encode the wireless signals. The rake receiver attempts to gather as much signal power as possible by identifying multi-path replicas of a transmitted signal and assigning separate correlators to each of them. These correlators are commonly referred to as rake "fingers," and a rake receiver typically has three fingers. Each finger may be configured to independently recover a particular code, or a particular spreading sequence offset by a time delay. To exploit the multi-path resolution possibilities via a rake receiver, in one example, the delay spread of incoming signals should be greater than the chip rate used in transmission. Therefore, conventionally, the fingers of a rake receiver are equally spaced to recover signals at least ⅛ chip apart from each other.

In one embodiment, while communicating between sectors of the same cell site within the wireless communication system 100, the MS 102 can advantageously use just one rake finger to monitor the one time delay assigned to all the sectors in the reverse link. (However, the MS 102 may use more than one rake finger to monitor pilot signal strengths of time delays from sectors of different cell sites.) While communicating within a single cell site, the MS 102 may thus conserve power by employing only the one rake finger, as compared to existing operation where an MS typically uses as much as three or more rake fingers to monitor pilot signals from different sectors of the cell site.

Figure 4:
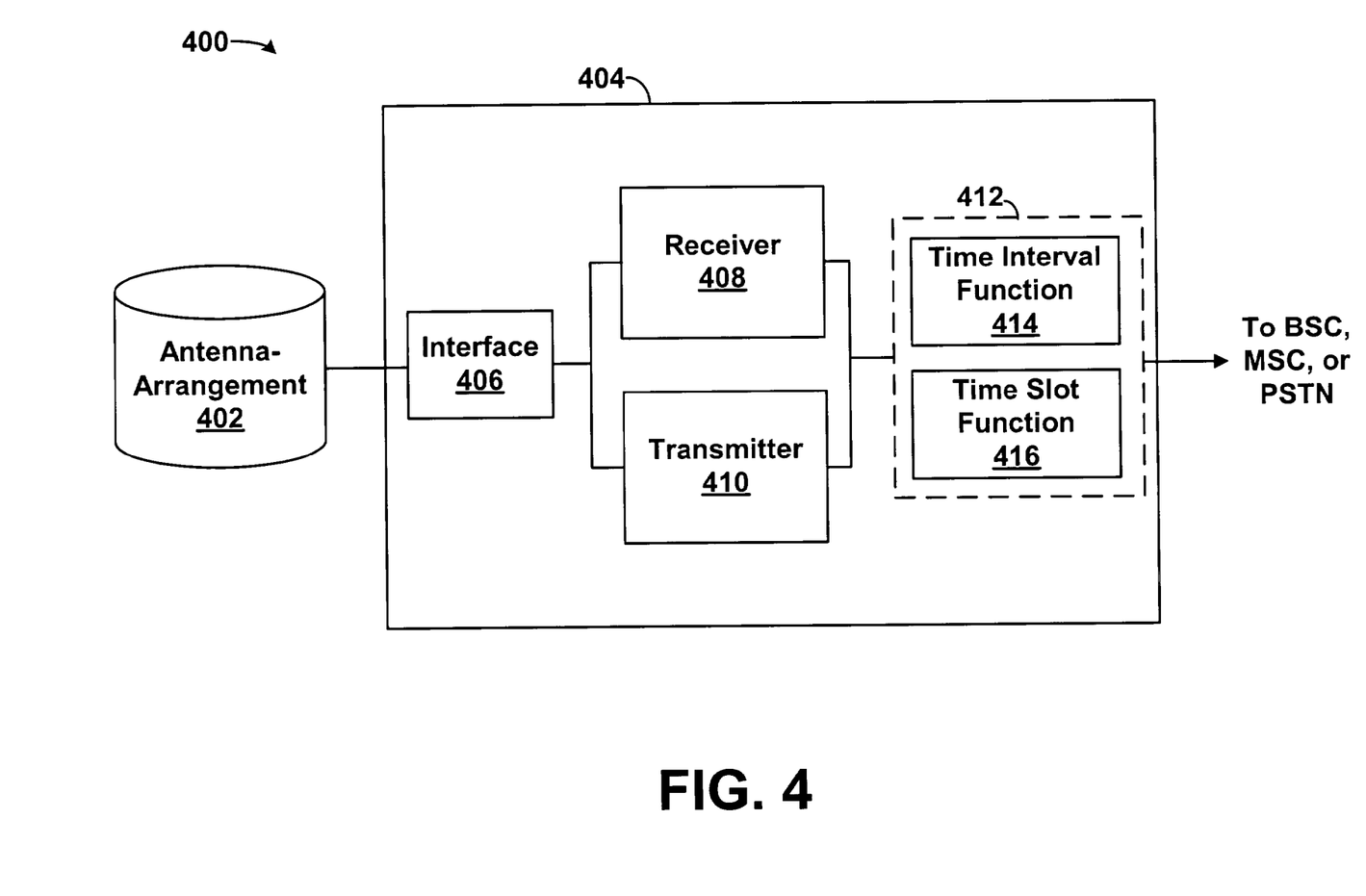
FIG. 4 illustrates one embodiment of a base station.

FIG. 4 illustrates one embodiment of a BTS 400. The BTS 400 may include an antenna-arrangement 402, and a group of equipment 404. The group of equipment 404 may include an interface 406, a receiver 408, a transmitter 410, and a processing unit 412. The processing unit 412 may include a time interval function 414 and a time slot function 416 (e.g., software modules executable by a processor).

The antenna-arrangement 402 may be any antenna system that can radiate in multiple directions. Directional beamforming antennas may be used, such as antennas with the capabilities to focus an RF radiation pattern on a particular coverage area. The antenna-arrangement 402 may comprise one or more antennas and/or one or more antenna arrays. The group of equipment 404 may include more or less equipment than illustrated. The interface 406 may receive signals from the antenna-arrangement 402 and direct the signals to the receiver 408. The interface 406 may also receive signals from the transmitter 410 and send the signals to the antenna-arrangement 402.

The time interval function 414 and the time slot function 416, and additional functions if present, of the processing unit 412 may be provided using machine language instructions or software with object-oriented machine language instructions, such as the C++ programming language. However, other programming languages (such as the C programming language for instance) could be used as well.

The processing unit 412 may operate according to an operating system, which may be any suitable commercially available embedded or disk-based operating system, or any proprietary operating system. The processing unit 412 may comprise one or more smaller processing units, including, for example, a programmable digital signal processing engine. The processing unit 412 may also be implemented as a single application specific integrated circuit (ASIC) to improve speed and to economize space.

Storage (not illustrated in FIG. 4) may also be included within the group of equipment 404 and may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, compact-disc read only memory (CD-ROM), and/or any other volatile or non-volatile storage systems. Machine language instructions comprising the time interval function 414 and the time slot function 416 may be stored within storage of the group of equipment 404. Other data may also be stored in the storage as well.

The machine language instructions comprising the time interval function 414 may be executed to assign to all sectors of a cell site in the wireless communication system 100 a time interval of the common spreading sequence to encode signals. The machine language instructions comprising the time slot function 416 may be executable to select and assign a respective time slot of the time interval of the common spreading sequence for each respective sector of the cell site to encode signals.

Figure 5:
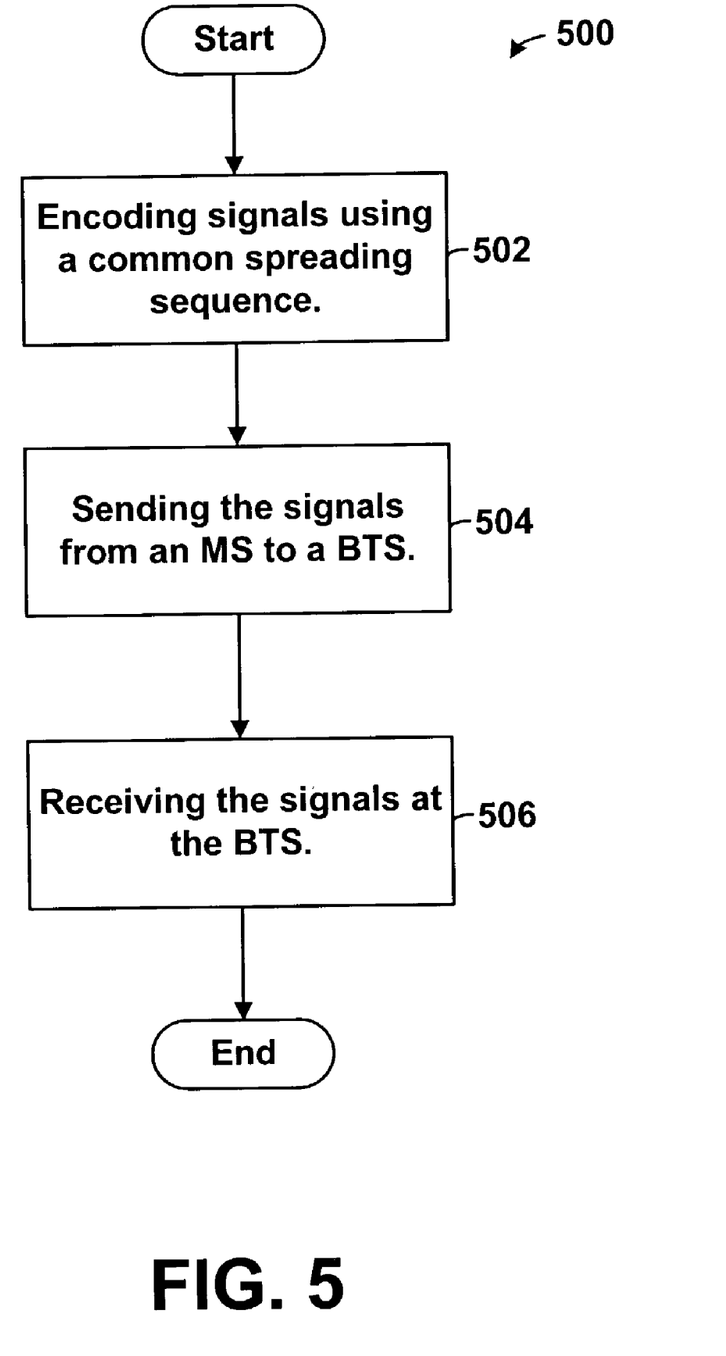
FIG. 5 is a flowchart depicting functional blocks of a method according to one embodiment.

FIG. 5 illustrates one embodiment of a method 500 of reverse link communications between an MS and a BTS in a wireless communication system. Signals that are to be sent from the MS to the BTS may be encoded using a common spreading sequence (throughout the cell site), as shown at block 502. All of the signals may be encoded by the common spreading sequence offset by a common time delay. The signals may be sent from the MS to the BTS as shown at block 504 and the signals may be received at the BTS as shown at block 506.

Figure 6:
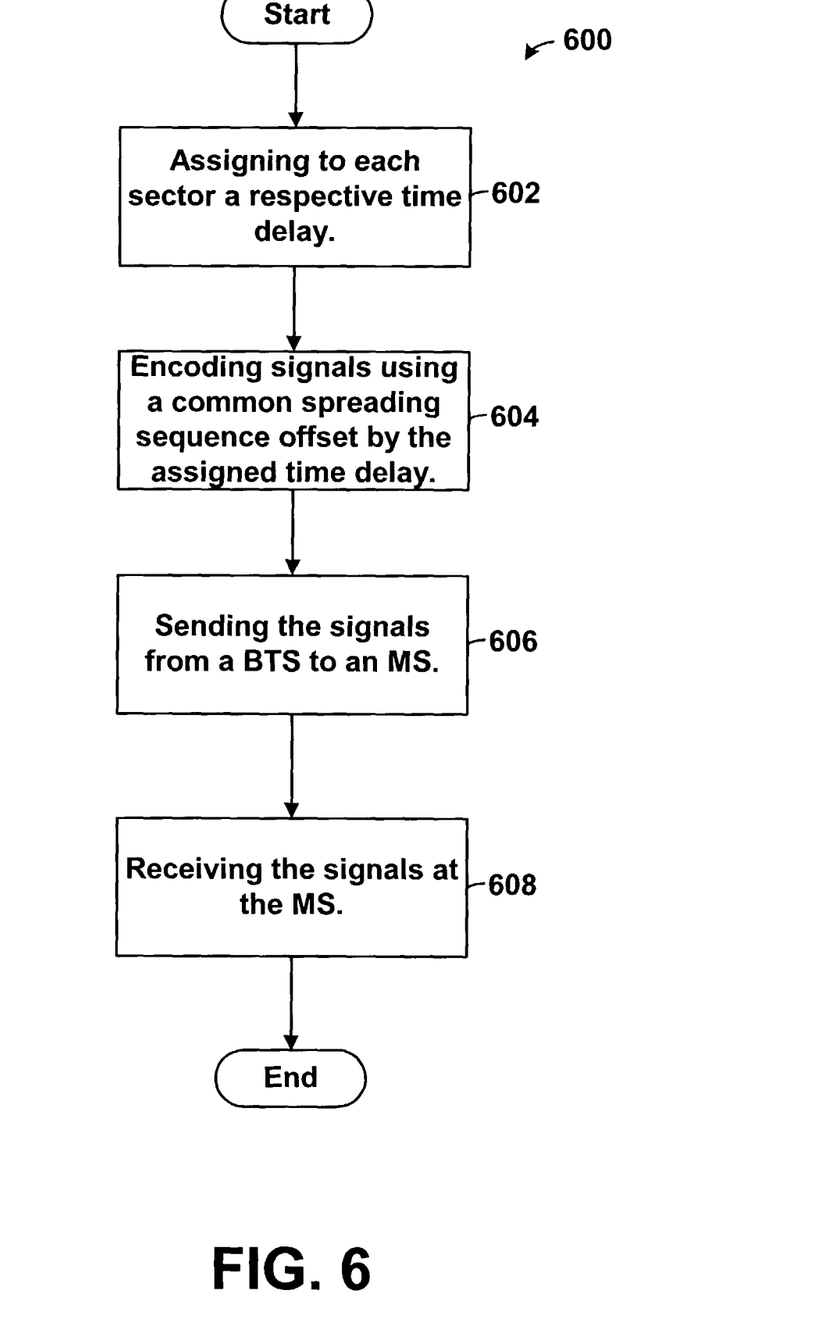
FIG. 6 is a flowchart depicting functional blocks of a method according to one embodiment.

FIG. 6 illustrates one embodiment of a method 600 of forward link communications between an MS and a BTS in a wireless communication system. Each sector of a cell site that the MS is operating within is assigned a respective time delay, as shown at block 602. The respective time delays may be assigned to be within the common time delay of the method 500, which used to offset the common spreading sequence to encode signals during reverse link communications. Signals may be encoded using the common spreading sequence offset by the sector's respective time delay, as shown at block 604. The signals may be sent from the BTS to the MS, as shown at block 606, and the signals may be received at the BTS, as shown at block 608.

Those skilled in the art to which the present invention pertains may make modifications resulting in other embodiments employing principles of the present invention without departing from its spirit or characteristics. Accordingly, the described embodiments and examples are to be considered in all respects only as illustrative, and not restrictive, and the scope of the present invention is, therefore, indicated by the appended claims rather than by the foregoing description. Consequently, modifications apparent to those skilled in the art would still fall within the scope of the invention.

For example, while the foregoing description is presented in terms of cells and sectors, the method and system presented herein can be applied equally for any area of a wireless communication system. Furthermore, the method and system presented herein can extend equally for use in any wireless communication network (e.g., time division multiple access (TDMA) network, frequency division multiple access (FDMA) network, etc.).

Additionally, while the foregoing description is presented in terms of a spreading code/sequence, the method and system presented herein can be implemented using any signal-encoding scheme regardless of form and/or regardless of how it is assigned to the system. Other examples are possible as well.

We claim:

1. In a cellular base station of the type that radiates in a number of directions so as to provide a number of sectors each having a respective air interface through which a mobile station in a given sector communicates with the base station, a method comprising:

in all of the number of sectors, the base station receiving mobile station signals that have been encoded with a common spreading sequence;

assigning to each sector of the number of sectors a respective time delay, such that any adjacent sectors of the number of sectors have different respective time delays than each other, the respective time delay being within a time window such that the mobile station would recognize a received signal encoded with the common spreading sequence offset by any of the respective time delays to be equivalently encoded signals; and in each sector of the number of sectors, the base station (i) encoding a respective signal with the common spreading sequence offset by the sector's respective time delay, so as to provide an encoded signal for the sector and (ii) sending the encoded signal into the sector's respective air interface for receipt by a mobile station operating in the sector.

2. The method of claim 1, wherein receiving mobile station signals that have been encoded with the common spreading sequence comprises receiving mobile station signals that have been encoded with a code division multiple access (CDMA) pseudo-noise (PN) sequence.

3. The method of claim 1, wherein receiving mobile station signals that have been encoded with the common spreading sequence comprises receiving mobile station signals that have been encoded with a pseudo-noise (PN) sequence offset by a common time delay.

4. The method of claim 3, wherein the common time delay is approximately 52 micro-seconds.

5. The method of claim 3, wherein assigning to each sector of the number of sectors the respective time delay comprises assigning to each sector a respective time slot of the common time delay of the PN sequence.

6. The method of claim 5, wherein encoding the respective signal with the common spreading sequence offset by the sector's respective time delay comprises encoding the respective signal with the common spreading sequence offset by the sector's respective time slot.

7. The method of claim 1, wherein encoding the respective signal with the common spreading sequence offset by the sector's respective time delay comprises modulating the respective signal with the common spreading sequence offset by the sector's respective time delay using spread spectrum modulation.

8. The method of claim 7, wherein modulating the respective signal comprises using a modulation technique selected from the group consisting of a direct sequence spreading technique and a frequency hopping spreading technique.

9. The method of claim 1, wherein encoding the respective signal with the common spreading sequence offset by the sector's respective time delay comprises increasing a bandwidth of the respective signal.

10. The method of claim 1, wherein the common spreading sequence defines a sequence of chips, and wherein assigning to each sector of the number of sectors the respective time delay comprises assigning to each sector a respective subsequence of chips.

11. The method of claim 10, wherein assigning to each sector the respective subsequence of chips comprises assigning to each sector the respective subsequence of chips such that each respective subsequence of chips only differs by at most approximately 64 chips.

12. A cellular base station of the type that radiates in a number of directions so as to provide a number of sectors each having a respective air interface through which a mobile station in a given sector communicates with the base station, wherein communications between the mobile station and the base station are encoded with a pseudo-noise (PN) sequence, wherein reverse link communications between the mobile station while in any of the number of sectors and the cellular base station are encoded with the PN sequence offset by a common time delay, and wherein forward link communications between the mobile station while in a respective sector of the number of sectors and the cellular base station are encoded with the PN sequence offset by a respective time delay that is within the common time delay such that forward link communications within any adjacent sectors of the number of sectors are encoded with the PN sequence offset by a different time delay than each other.

13. The cellular base station of claim 12, wherein the cellular base station produces an omni-sectored cell site.

14. The cellular base station of claim 12, wherein the common time delay corresponds to a code division multiple access (CDMA) PN-offset time window.

15. The cellular base station of claim 12, further comprising a receiver, a transmitter, and a processing unit.

16. The cellular base station of claim 15, wherein the processing unit is operable to execute machine language instructions comprising selecting the common time delay and selecting the respective time delays within the common time delay.

17. A system comprising:
   means for providing radiation patterns that define a number of sectors of a cellular base station, each sector having a respective air interface;
   means for differentiating signals transmitted from a mobile station to the cellular base station through any of the respective air interfaces by encoding the signals with a common spreading sequence offset by a common time delay; and
   means for differentiating signals transmitted from the cellular base station to the mobile station through any of the respective air interfaces by encoding the signals with a respective portion of the common spreading sequence, wherein each respective air interface is assigned a different respective portion of the common spreading sequence.

18. The system of claim 17, wherein the means for providing radiation patterns comprise antenna-arrangements.

19. The system of claim 17, wherein the means for differentiating signals transmitted from the mobile station to the cellular base station comprise a processing unit operable to execute machine language instructions comprising encoding the signals transmitted from the mobile station to the cellular base station with the common spreading sequence offset by the common time delay.

20. The system of claim 17, wherein the means for differentiating signals transmitted from the cellular base station to the mobile station comprise a processing unit operable to execute machine language instructions comprising encoding the signals transmitted from the cellular base station to the mobile station with the common spreading sequence offset by a respective time slot of the common time delay.

* * * * *